US012372914B2

(12) United States Patent
Morishita

(10) Patent No.: US 12,372,914 B2
(45) Date of Patent: Jul. 29, 2025

(54) IMAGE FORMING APPARATUS

(71) Applicant: KYOCERA Document Solutions Inc., Osaka (JP)

(72) Inventor: Hiroki Morishita, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 18/753,201

(22) Filed: Jun. 25, 2024

(65) Prior Publication Data

US 2025/0004416 A1 Jan. 2, 2025

(30) Foreign Application Priority Data

Jun. 28, 2023 (JP) ................................ 2023-105727

(51) Int. Cl.
*G03G 15/00* (2006.01)
*G03G 21/16* (2006.01)
*G03G 21/18* (2006.01)

(52) U.S. Cl.
CPC ..... *G03G 21/1652* (2013.01); *G03G 21/1842* (2013.01); *G03G 2221/166* (2013.01)

(58) Field of Classification Search
CPC . G03G 15/00; G03G 21/1652; G03G 21/1842
USPC .................................... 399/90, 107, 109–111
See application file for complete search history.

(56) References Cited

U.S. PATENT DOCUMENTS

| | | | | |
|---|---|---|---|---|
| 7,684,728 | B2 * | 3/2010 | Okabe | G03G 21/1676 399/119 |
| 9,885,996 | B2 * | 2/2018 | Fukuchi | G03G 21/105 |
| 2008/0279579 | A1 | 11/2008 | Kuruma | 399/90 |

FOREIGN PATENT DOCUMENTS

| | | |
|---|---|---|
| JP | 2008-276117 A | 11/2008 |

* cited by examiner

*Primary Examiner* — Hoan H Tran
(74) *Attorney, Agent, or Firm* — Stein IP LLC

(57) ABSTRACT

An image forming apparatus includes a process unit that can be removed from a main body frame by being pulled out in a first direction, a plurality of main body side contacts that are arranged in the first direction and a plurality of unit side contacts, the main body frame includes a guide surface that extends in the first direction, the process unit includes a roller and the guide surface includes an inclination surface that is inclined toward a downstream side from an upstream side in a pulling-out direction. The roller travels on the inclination surface such that the position of the unit side contacts is displaced to an avoidance position where the unit side contacts do not collide with the main body side contacts.

6 Claims, 16 Drawing Sheets

IMAGE FORMING APPARATUS

INCORPORATION BY REFERENCE

This application is based upon and claims the benefit of priority from the corresponding Japanese Patent Application No. 2023-105727 (filed on Jun. 28, 2023), the entire contents of which are incorporated herein by reference.

BACKGROUND

The present disclosure relates to image forming apparatuses.

A conventional image forming apparatus includes a process unit which is removable with respect to the main body of the apparatus. The process unit includes a development cartridge for developing a toner image and the like.

When the process unit is fitted into the main body of the apparatus, the process unit and the main body of the apparatus need to be electrically connected. Hence, in the main body of the apparatus, main body side contacts are provided, and in the process unit, unit side contacts are provided. The main body side contacts and the unit side contacts are brought into contact with each other, and thus the process unit and the main body of the apparatus are electrically connected.

SUMMARY

An image forming apparatus according to an aspect of the present disclosure includes a main body frame, a process unit, a plurality of main body side contacts and a plurality of unit side contacts. The main body frame includes a fitting region. The process unit is removably fitted into the fitting region, can be removed from the main body frame by being pulled out to one side in a first direction orthogonal to an up/down direction in a state where the process unit is fitted into the fitting region and performs development process which develops an electrostatic latent image into a toner image. The main body side contacts are arranged in the main body frame, protrude toward the fitting region in a second direction horizontally orthogonal to the first direction and are spaced in the first direction. The unit side contacts are arranged in the process unit, are respectively assigned to the main body side contacts and are brought into contact with the main body side contacts to which the unit side contacts are assigned in the state where the process unit is fitted into the fitting region. The main body frame includes a guide surface that extends in the first direction. The process unit includes a roller that travels on the guide surface when the process unit is fitted into or removed from the fitting region. The guide surface includes an inclination surface that is inclined either upward or downward in the up/down direction toward a downstream side from an upstream side in a pulling-out direction when the process unit is pulled out from the fitting region. When the process unit is pulled out from the fitting region, the roller travels on the inclination surface such that a position of the unit side contacts in the up/down direction is displaced to an avoidance position where the unit side contacts do not collide with the main body side contacts located on the downstream side in the pulling-out direction.

DETAILED DESCRIPTION

An image forming apparatus 100 according to an embodiment of the present disclosure will be described below with reference to FIGS. 1 to 16. Although in the following description, a color laser printer of a tandem system is illustrated, the present disclosure is not limited to a printer and can be applied to a multifunctional peripheral which has a copying function and the like.

In the following description, a direction perpendicular to a flat floor surface on which the image forming apparatus 100 is installed is assumed to be an up/down direction. One horizontal direction orthogonal to the up/down direction is identified with a symbol D1, and is referred to as a first direction D1, and another horizontal direction orthogonal to the one horizontal direction is identified with a symbol D2, and is referred to as a second direction D2. The "horizontal" includes not only completely horizontal but also substantially horizontal.

For example, the first direction D1 is the forward/backward direction (depth direction) of the image forming apparatus 100. One side in the first direction D1 is a front side, and the other side opposite to the one side in the first direction D1 is a back side. The second direction D2 is the left/right direction (width direction) of the image forming apparatus 100. One side in the second direction D2 is a left side, and the other side opposite to the one side in the second direction D2 is a right side.

<Overall Configuration of Image Forming Apparatus>

Figure 1:
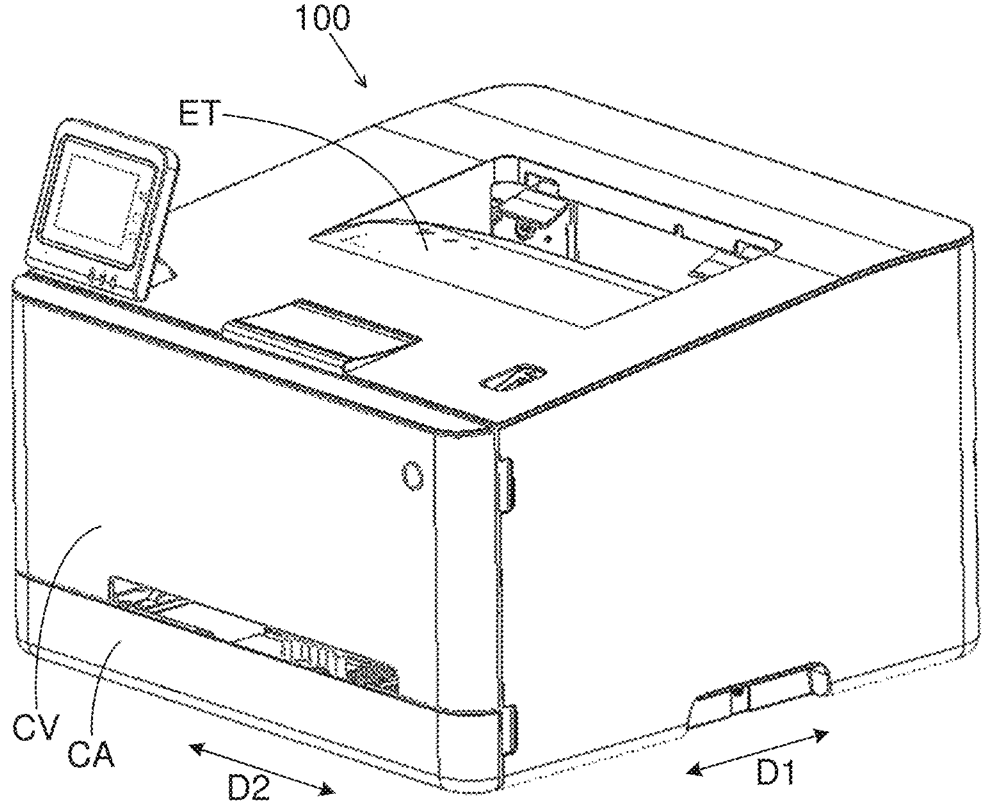
FIG. 1 is a perspective view of an image forming apparatus according to an embodiment.
Figure 2:
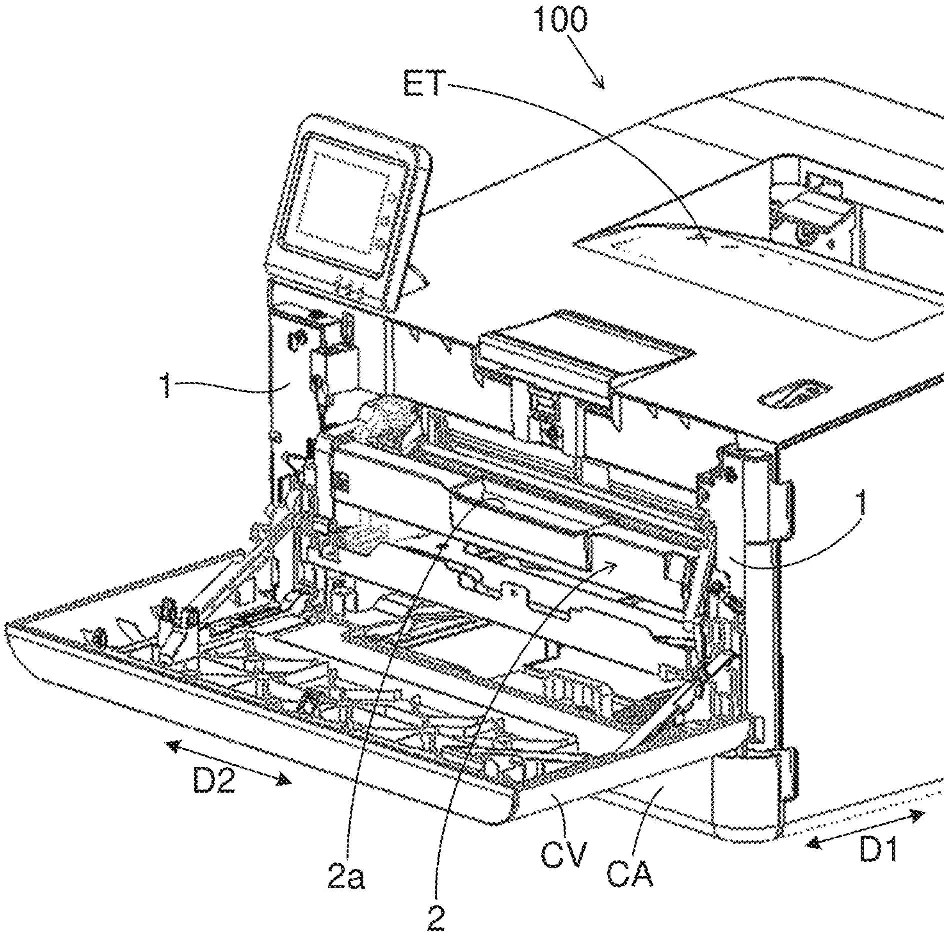
FIG. 2 is a perspective view showing a state where the front cover of the image forming apparatus shown in FIG. 1 is opened.

The image forming apparatus 100 of the present embodiment has an appearance as shown in FIGS. 1 and 2. The image forming apparatus 100 includes a main body frame 1. The image forming apparatus 100 also includes a front cover CV. The main body frame 1 is covered with an exterior cover which includes the front cover CV (the symbols of the other covers are omitted). The main body frame 1 supports the exterior cover. The front cover CV is arranged on the one side in the first direction D1. The front cover CV covers the internal region of the image forming apparatus 100 from the one side in the first direction D1.

The main body frame 1 includes a fitting region 100A (see FIGS. 6 and 11) into which a process unit 2 to be described later is fitted. The internal region of the image forming apparatus 100 serves as the fitting region 100A. The main body frame 1 supports the front cover CV such that the front cover CV is rotatable around an axis extending in the second direction D2. The front cover CV uses end portions of its lower side as support points, and turns to swing end portions of its upper side. In other words, the front cover CV is supported such that the front cover CV can be opened and closed with respect to the main body frame 1. The front cover CV is opened, and thus the fitting region 100A is exposed to the one side in the first direction D1 (see FIG. 2). The front cover CV is closed, and thus the fitting region 100A is covered from the one side in the first direction D1 (see FIG. 1).

Figure 3:
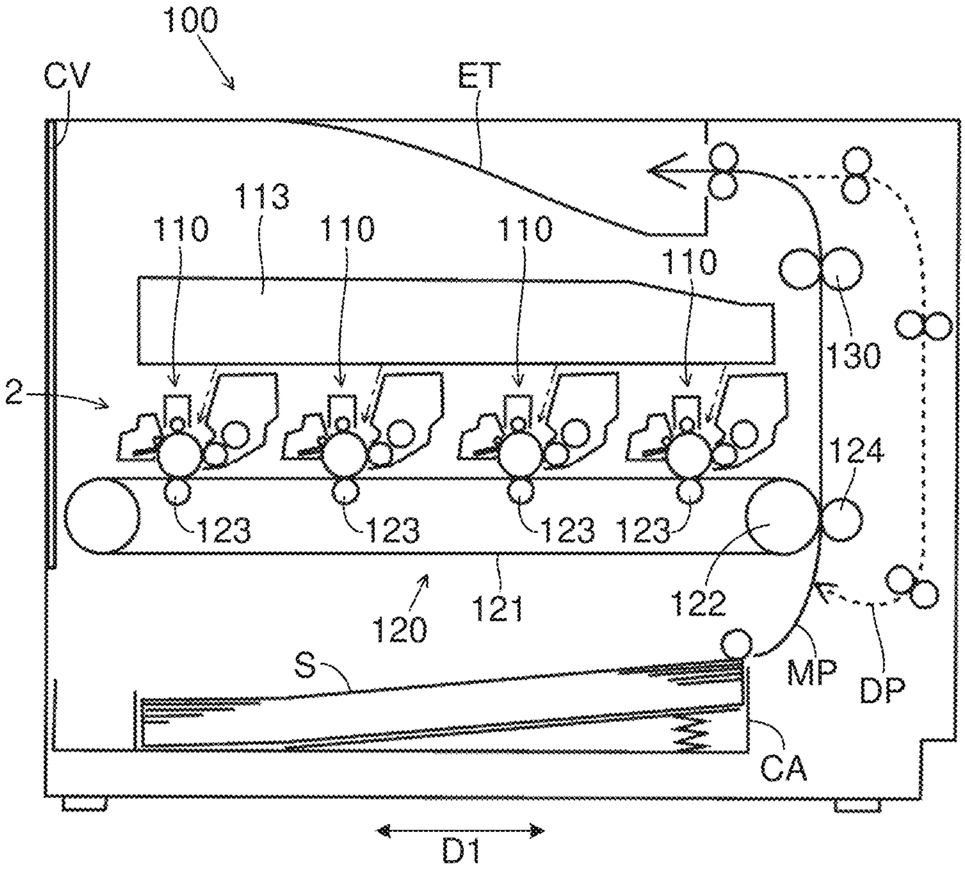
FIG. 3 is schematic view showing an internal configuration of the image forming apparatus according to the embodiment.

As shown in FIG. 3, the image forming apparatus 100 includes a main conveyance path MP. In FIG. 3, the main conveyance path MP is schematically indicated by a solid line with an arrow. A double-sided printing conveyance path DP which will be described later is schematically indicated by a dotted line with an arrow.

The image forming apparatus 100 includes a sheet cassette CA. The sheet cassette CA stores a sheet S which is used in a print job. The type of sheet S is not particularly limited.

In the print job, the image forming apparatus 100 supplies the sheet S in the sheet cassette CA to the main conveyance path MP, and coveys the sheet S along the main conveyance path MP. Then, the image forming apparatus 100 prints an image on the sheet S being conveyed. In other words, the image forming apparatus 100 transfers a toner image to the sheet S being conveyed.

The sheet cassette CA is fitted into a lower portion of the main body of the image forming apparatus 100. The sheet cassette CA is removable with respect to the main body (that is, the main body frame 1) of the image forming apparatus 100. The sheet cassette CA is pulled out from the main body of the apparatus to the one side in the first direction D1, and thus it is possible to remove the sheet cassette CA from the main body of the apparatus.

The image forming apparatus 100 includes image formation units 110 for four colors of cyan, magenta, yellow and black. The image formation units 110 form toner images corresponding to the colors. Attention will be focused on one of the image formation units 110, and the configuration of the image formation unit 110 will be described below. The image formation units 110 basically have the same configuration. Hence, the following description is assumed to be used for the description of the configurations of the other image formation units 110, and thus the description of the configurations of the other image formation units 110 is omitted.

Figure 4:
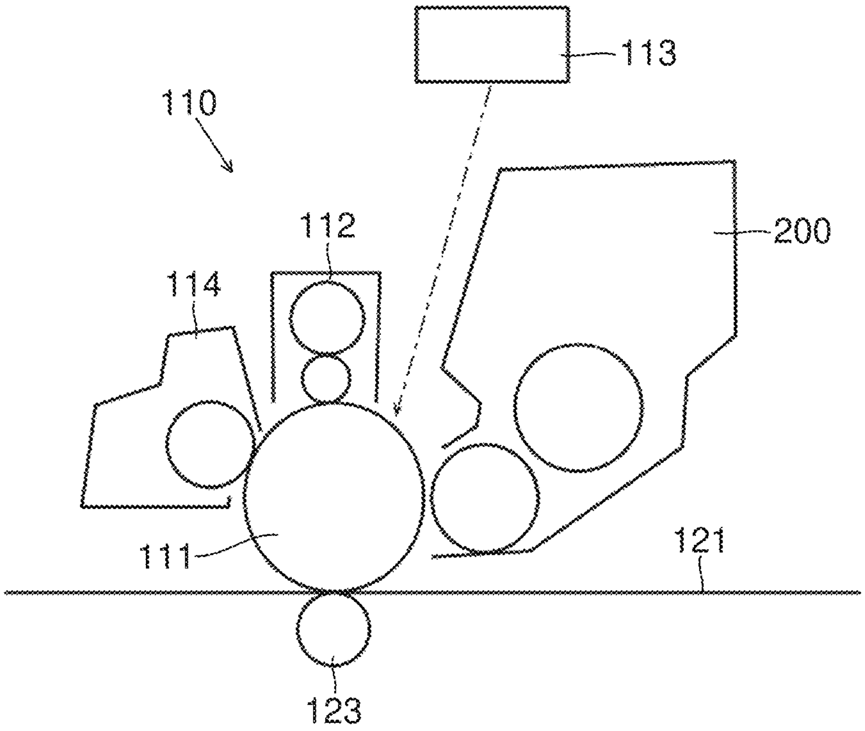
FIG. 4 is schematic view showing an image formation unit in the image forming apparatus according to the embodiment.

As shown in FIG. 4, the image formation unit 110 includes a development cartridge 200. The development cartridge 200 stores the toner of the corresponding color, and uses the toner to perform a development process. The image formation unit 110 includes a photosensitive drum 111 and a charging device 112. The image forming apparatus 100 includes one exposure unit 113 for the image formation units 110 of the four colors. The image formation unit 110 includes a cleaning device 114.

When the image formation unit 110 performs image formation, the photosensitive drum 111 is rotated. The charging device 112 charges the outer circumferential surface of the photosensitive drum 111. The exposure unit 113 exposes the outer circumferential surface of the photosensitive drum 111 to form an electrostatic latent image on the outer circumferential surface of the photosensitive drum 111. Then, the development cartridge 200 supplies, as the development process, the toner to the outer circumferential surface of the photosensitive drum 111, and performs a process for developing the electrostatic latent image into the toner image. The toner image on the outer circumferential surface of the photosensitive drum 111 is primarily transferred to an intermediate transfer belt 121 which will be described later. The cleaning device 114 removes the toner which is left on the outer circumferential surface of the photosensitive drum 111 without being transferred to the intermediate transfer belt 121.

With reference back to FIG. 3, the image forming apparatus 100 includes an intermediate transfer unit 120. The intermediate transfer unit 120 is arranged below the image formation units 110. The intermediate transfer unit 120 includes the intermediate transfer belt 121. The intermediate transfer belt 121 is an endless belt. The intermediate transfer belt 121 corresponds to an "intermediate transfer member".

The intermediate transfer belt 121 is tensioned and is rotatably supported by a plurality of rollers including a drive roller 122 (the symbols of the other rollers are omitted). The intermediate transfer belt 121 is brought into contact with the outer circumferential surfaces of the photosensitive drums 111, and is rotated in this state. The drive roller 122 is rotated with power transmitted from a belt motor (not shown). The intermediate transfer belt 121 is rotated by following the rotation of the drive roller 122.

The intermediate transfer unit 120 includes primary transfer rollers 123. The primary transfer rollers 123 are respectively assigned to the colors of cyan, magenta, yellow and black. The primary transfer rollers 123 are arranged on the inner circumferential side of the intermediate transfer belt 121. The primary transfer rollers 123 are respectively arranged opposite the photosensitive drums 111 of the corresponding colors through the intermediate transfer belt 121.

The intermediate transfer unit 120 includes a secondary transfer roller 124. The secondary transfer roller 124 is pressed against the outer circumferential surface of the intermediate transfer belt 121 to form a transfer nip between the intermediate transfer belt 121 and itself. The main conveyance path MP passes through the transfer nip.

The image formation units 110 form the toner images of the corresponding colors. Then, the primary transfer rollers 123 primarily transfer the toner images to the outer circumferential surface of the intermediate transfer belt 121. In other words, the intermediate transfer belt 121 receives the transfer of the toner images from the process unit 2 which will be described later. The intermediate transfer belt 121 is rotated while carrying, on the outer circumferential surface, the toner images primarily transferred from the photosensitive drums 111. While the sheet S is being passed through the transfer nip, the sheet S makes contact with the outer circumferential surface of the intermediate transfer belt 121. The secondary transfer roller 124 forms a transfer electric field between the intermediate transfer belt 121 and itself to secondarily transfer the toner images to the sheet S which is being passed through the transfer nip.

The image forming apparatus 100 includes a fixing roller pair 130. The fixing roller pair 130 includes a heating roller and a pressure roller. The heating roller incorporates a heater. The pressure roller is pressed against the heating roller to form a fixing nip between the heating roller and itself. The fixing roller pair 130 is rotated while nipping the sheet S which is conveyed from the transfer nip. In other words, the fixing roller pair 130 heats and pressurizes the sheet S which is passed through the fixing nip. In this way, the fixing roller pair 130 fixes, to the sheet S, the toner images transferred to the sheet S. Thereafter, the sheet S is ejected to an ejection tray ET.

The image forming apparatus 100 can perform, as the print job, not only a single-sided print job for printing the toner images on only one side of the sheet S but also a double-sided print job for printing the toner images on both sides of the sheet S. In order to perform the double-sided print job, the image forming apparatus 100 includes the double-sided printing conveyance path DP.

The double-sided printing conveyance path DP is branched from the main conveyance path MP on the downstream side of the main conveyance path MP in a sheet conveyance direction with respect to the fixing nip. Then, the double-sided printing conveyance path DP merges into the main conveyance path MP on the upstream side of the main conveyance path MP in the sheet conveyance direction with respect to the transfer nip.

When a performance job is the single-sided print job, the sheet S is passed through the transfer nip only once, and transfer processing is performed once on the sheet S being passed through the transfer nip. Then, after the transfer processing is performed for the first time, the sheet S is ejected to the ejection tray ET without being processed.

When the performance job is the double-sided print job, since the transfer processing is performed once on each of the front and back sides of the sheet S, the sheet S is passed through the transfer nip twice. Specifically, when the sheet S is passed through the transfer nip for the first time, the transfer processing is performed on one side of the sheet S. After the transfer processing is performed for the first time, the sheet S is switched back before the back end of the sheet S is passed through the fixing nip and then the sheet S is completely ejected to the ejection tray ET. In this way, the sheet S is drawn into the double-sided printing conveyance path DP from its back end.

Thereafter, the sheet S is conveyed along the double-sided printing conveyance path DP. Then, the sheet S is returned to the main conveyance path MP from the upstream side of the transfer nip in the sheet conveyance direction. The sheet S which has been returned to the main conveyance path MP is passed though the transfer nip again. Here, the directions of the front and back sides of the sheet S are reversed with respect to those when the sheet S was previously passed through the transfer nip. In this way, when the sheet S is passed through the transfer nip for the second time, the transfer processing is performed on the other side opposite to the one side of the sheet S.

<Configuration of Process Unit>

The image forming apparatus 100 includes the process unit 2 which performs the development process for developing the electrostatic latent image into the toner image. Specifically, the image formation units 110 for the four colors (that is, a plurality of colors) are unitized to form the process unit 2. In other words, the process unit 2 includes at least development cartridges 200 for the four colors (that is, a plurality of colors).

Figure 5:
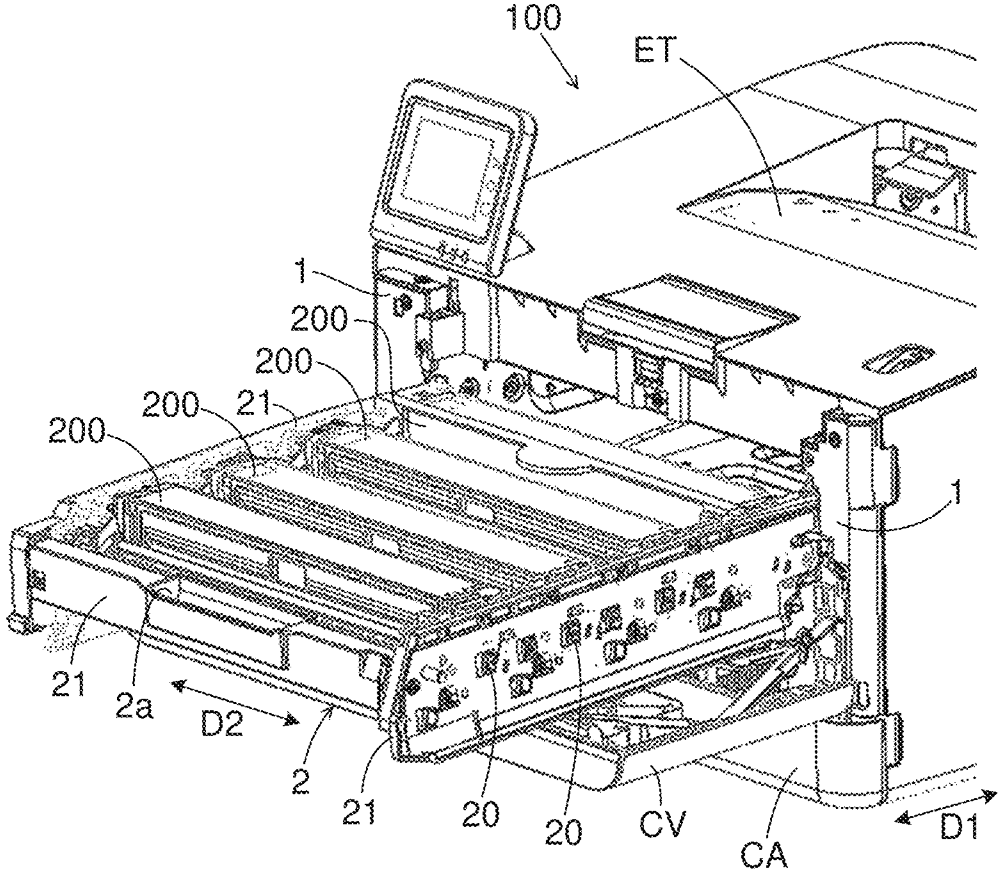
FIG. 5 is a perspective view showing a state where the process unit of the image forming apparatus shown in FIG. 1 is pulled out.

The process unit 2 includes a unit frame 21 (see FIG. 5). In the unit frame 21, the image formation units 110 for the four colors are arranged. In other words, in the unit frame 21, the development cartridges 200 for the four colors are arranged. The image formation units 110 for the four colors are arranged in the unit frame 21, and thus the image formation units 110 for the four colors are unitized.

The image formation units 110 for the four colors are arranged in the first direction D1. In other words, the development cartridges 200 for the four colors are arranged in the first direction D1. Hence, the unit frame 21 includes a pair of side plates (the symbols of which are omitted) which sandwich the image formation units 110 for the four colors in the second direction D2. The pair of side plates in the unit frame 21 rotatably support rotating members included in the image formation units 110 for the four colors.

The unit frame 21 is removably fitted into the main body frame 1 in the horizontal direction (specifically, the first direction D1). In this way, the process unit 2 is removable with respect to the main body of the image forming apparatus 100 (that is, the main body frame 1) in the horizontal direction. During maintenance of the image forming apparatus 100, the process unit 2 is removed from the main body of the apparatus. For example, when any one of the development cartridges 200 is replaced, the process unit 2 is removed from the main body of the apparatus.

In an operation of removing the process unit 2, the front cover CV is first opened in a state where the process unit 2 is fitted into the main body of the image forming apparatus 100 (that is, in a state where the unit frame 21 is fitted into the main body frame 1). The front cover CV is opened, and thus the image forming apparatus 100 is brought into a state shown in FIG. 2. In other words, the process unit 2 is exposed to the one side in the first direction D1. Then, the unit frame 21 is pulled out to the one side in the first direction D1 in this state. The process unit 2 is pulled out to the one side in the first direction D1 in the state where the unit frame 21 is fitted into the fitting region 100A so as to be removed from the main body frame 1.

For example, the unit frame 21 includes a grip portion 2*a* which is gripped by an operator who removes the process unit 2. A state where the process unit 2 is pulled out to the one side in the first direction D1 from the main body frame 1 is shown in FIG. 5.

The process unit 2 is pulled out from the main body frame 1, and thus the development cartridges 200 for the four colors are exposed upward. The development cartridges 200 for the four colors are removably fitted into the unit frame 21 independently from each other. In this configuration, even when a certain development cartridge 200 is removed from the unit frame 21, the other development cartridges 200 remain fitted into the unit frame 21. In other words, in order to remove all the development cartridges 200 for the four colors from the unit frame 21, it is necessary to perform the removal operation on each of the development cartridges 200 for the four colors. Constituent elements of the image formation units 110 such as the photosensitive drums 111 other than the development cartridges 200 are fixedly fitted into the unit frame 21, and thus the constituent elements cannot be removed from the unit frame 21.

The development cartridges 200 for the four colors are removable with respect to the unit frame 21 in the up/down direction. When the development cartridges 200 for the four colors are removed from the unit frame 21, each of the development cartridges 200 for the four colors is raised from the unit frame 21. Hence, the unit frame 21 does not cover the development cartridges 200 for the four colors from above.

<Contact Structure of Main Body of Apparatus and Process Unit>

The image forming apparatus 100 has a contact structure as shown in FIGS. 6 to 10. In this way, when the process unit 2 is fitted into the main body frame 1, the main body of the image forming apparatus 100 and the process unit 2 are electrically connected.

Figure 6:
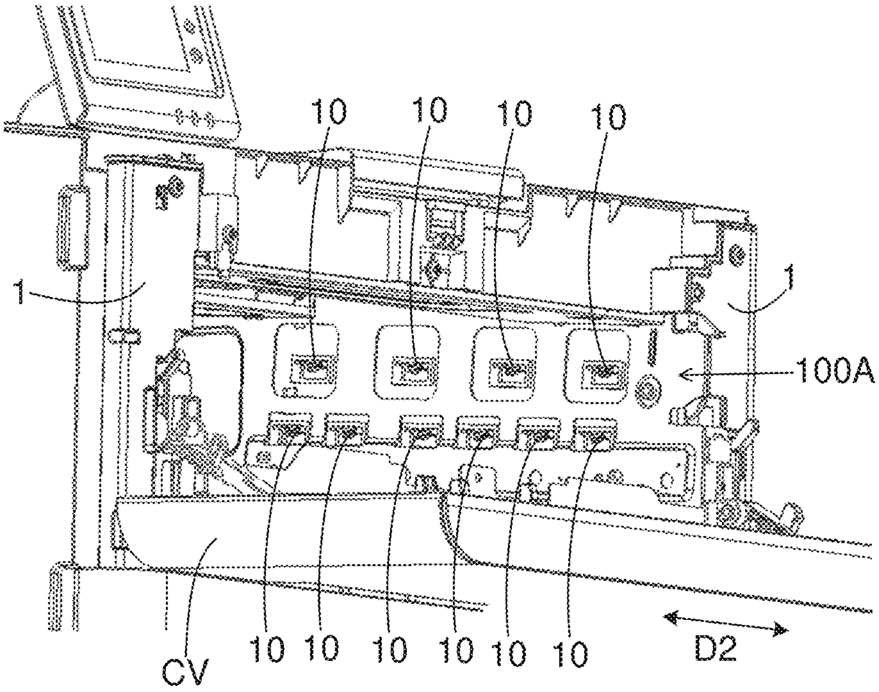
FIG. 6 is a perspective view showing main body side contacts in the image forming apparatus according to the embodiment.
Figure 7:
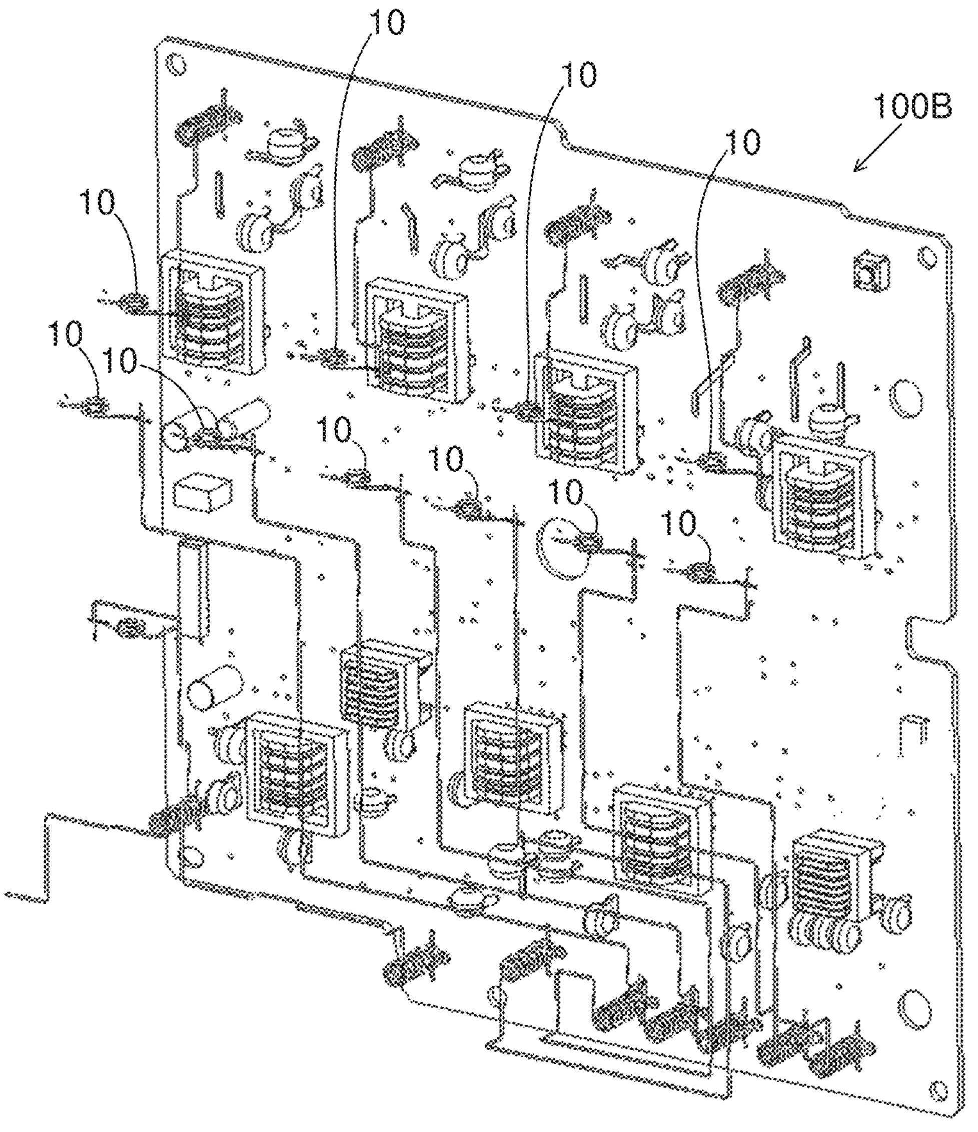
FIG. 7 is a perspective view showing a high voltage board in the image forming apparatus according to the embodiment.

Specifically, as shown in FIGS. 6 and 7, the image forming apparatus 100 includes main body side contacts 10. The main body side contacts 10 are connected to a high voltage board 100B. The high voltage board 100B is arranged in the main body frame 1. In this way, the main body side contacts 10 are arranged in the main body frame 1. FIG. 6 is a perspective view when the fitting region 100A is viewed from the front left of the image forming apparatus 100.

The high voltage board 100B is arranged on the right side of the main body frame 1. The main body side contacts 10 protrude from the right side of the main body frame 1 toward the fitting region 100A. In other words, the main body side contacts 10 protrude in the second direction D2. Furthermore, in other words, at least a part of the main body side contacts 10 are arranged in the fitting region 100A. In this way, the main body side contacts 10 can be brought into contact with the process unit 2 arranged in the fitting region 100A.

Figure 8:
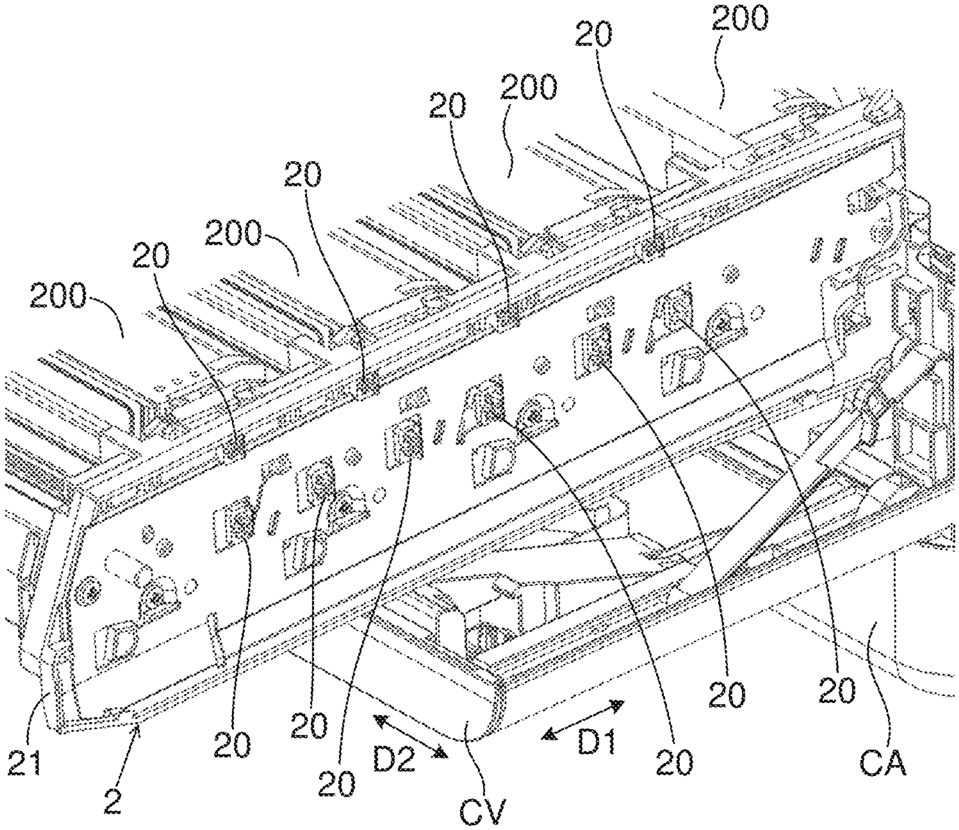
FIG. 8 is a perspective view showing unit side contacts in the image forming apparatus according to the embodiment.
Figure 9:
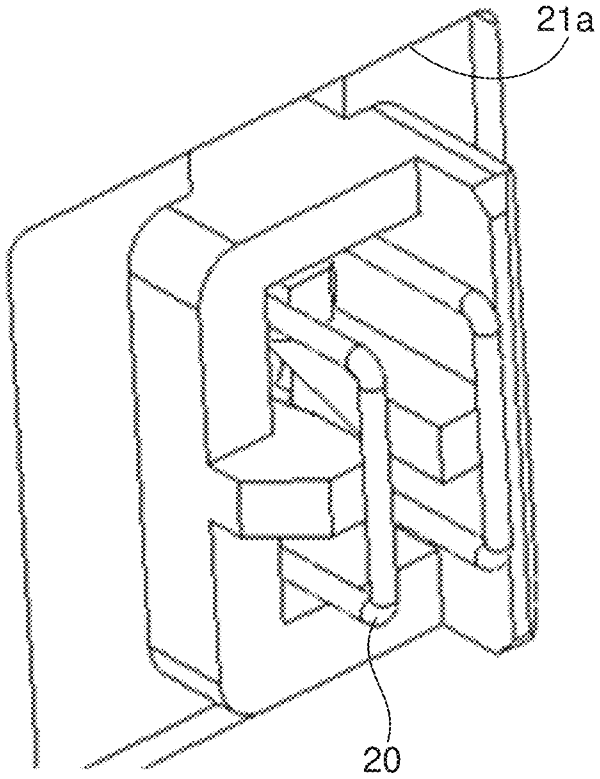
FIG. 9 is an enlarged view of the unit side contact in the image forming apparatus shown in FIG. 8.

As shown in FIGS. 8 and 9, the image forming apparatus 100 includes unit side contacts 20. The unit side contacts 20 are arranged in the process unit 2. In other words, the process unit 2 includes the unit side contacts 20. The unit side contacts 20 are supported by the unit frame 21. The unit side contacts 20 are exposed from through holes 21*a* formed in the unit frame 21. The unit side contacts 20 are connected to the constituent elements of the process unit 2 (such as the photosensitive drums 111 and the development cartridges 200).

A plurality of main body side contacts 10 are provided. The number of main body side contacts 10 is ten. A plurality of main body side contacts 10 are spaced in the first direction D1. The main body side contacts 10 are classified into an upper row and a lower row. The upper row includes four main body side contacts 10, and the lower row includes six main body side contacts 10.

The number of unit side contacts 20 is the same as the number of main body side contacts 10 (that is, a plurality of unit side contacts 20 are provided). The unit side contacts 20 are respectively assigned to the main body side contacts. When the number of main body side contacts 10 is ten, the number of unit side contacts 20 is ten. The unit side contacts 20 are respectively brought into contact with the main body side contacts 10 to which the unit side contacts 20 are assigned in a state where the process unit 2 is fitted into the fitting region 100A. In this way, the process unit 2 is electrically connected to the high voltage board 100B.

A detailed description will be given below with attention focused on a certain main body side contact 10. Here, the main body side contacts 10 have the same material and the same shape. Hence, the following description is assumed to be used for the description of the other main body side contacts 10, and thus the detailed description thereof is omitted.

Figure 10:
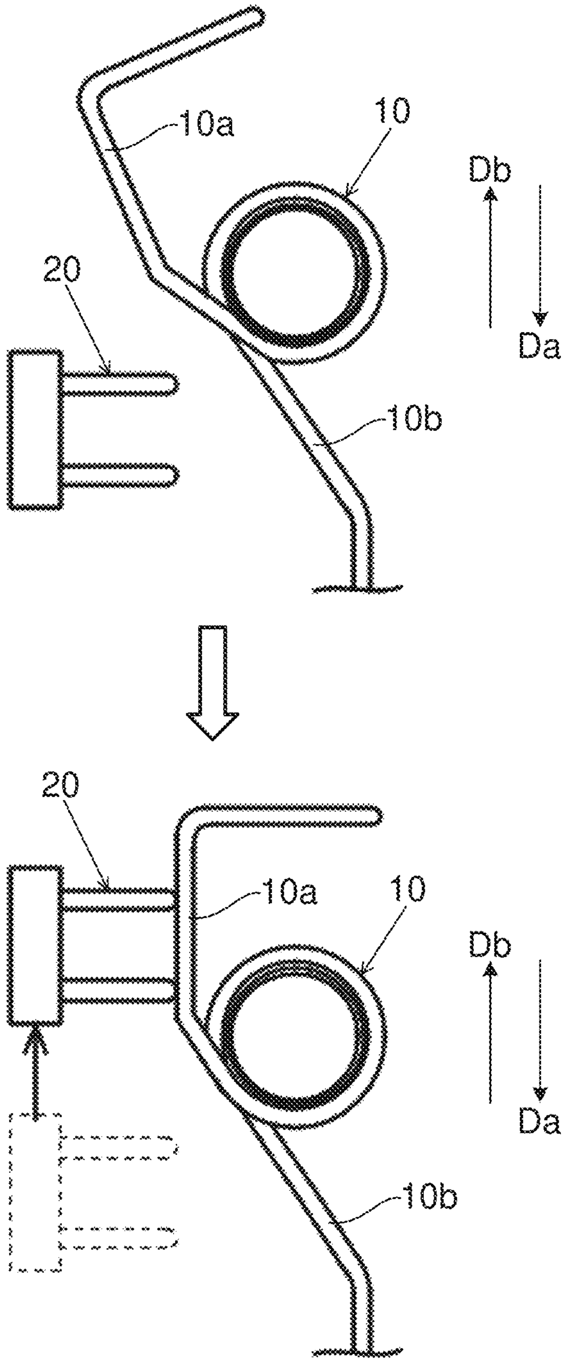
FIG. 10 is a schematic view showing the contact structure of the main body side contact and the unit side contact in the image forming apparatus according to the embodiment.

The main body side contact 10 is a torsion coil spring (see FIG. 10). Specifically, the main body side contact 10 includes a wound spring portion (the symbol of which is omitted) and a pair of arm portions 10*a* and 10*b* which extend tangentially from both ends of the wound spring portion. In the torsion coil spring serving as the main body side contact 10, the up/down direction is an axial direction. In the torsion coil spring serving as the main body side contact 10, the arm portion 10*a* on one side protrudes to the fitting region 100A, and can be brought into contact with the process unit 2 to be fitted into the fitting region 100A. In the torsion coil spring serving as the main body side contact 10, the arm portion 10*b* on the other side is fixed and connected to the high voltage board 100B.

The main body side contacts 10 biase the process unit 2 in the second direction D2 (specifically, from the right side to the left side). The process unit 2 is fitted into the fitting region 100A, and thus the main body side contacts 10 generate a biasing force toward the process unit 2.

Specifically, the process unit 2 is fitted into the fitting region 100A, and thus a state shown in the upper diagram of FIG. 10 transitions to a state shown in the lower diagram of FIG. 10. The state shown in the upper diagram of FIG. 10 is a state immediately before the process unit 2 is fitted into the fitting region 100A, and the state shown in the lower diagram of FIG. 10 is a state where the process unit 2 has been fitted into the fitting region 100A.

In the state shown in the upper diagram of FIG. 10, the unit side contact 20 is not in contact with the main body side contact 10. In the state shown in the upper diagram of FIG. 10, the process unit 2 is further pressed into the fitting region 100A, and thus the unit side contact 20 is brought into contact with the main body side contact 10. Here, by the unit side contact 20, the arm portion 10*a* of the main body side contact 10 is pressed in the torsional direction of the torsion coil spring. Then, the process unit 2 is further pressed into the fitting region 100A. In this way, the state shown in the lower diagram of FIG. 10 is achieved.

In FIG. 10, a direction in which the process unit 2 is pressed when the process unit 2 is fitted into the fitting region 100A is indicated by an arrow Db. In FIG. 10, a direction in which the process unit 2 is pulled out when the process unit 2 fitted into the fitting region 100A is removed from the main body frame 1 is indicated by an arrow Da. The same is true for FIGS. 12 to 16 which are referenced in the following description. The pulling-out direction Da of the process unit 2 corresponds to a direction toward the one side in the first direction D1, and the pressing direction Db of the process unit 2 corresponds to a direction toward the other side opposite to the one side in the first direction D1.

<Guide for Fitting and Removing Process Unit>

Figure 11:
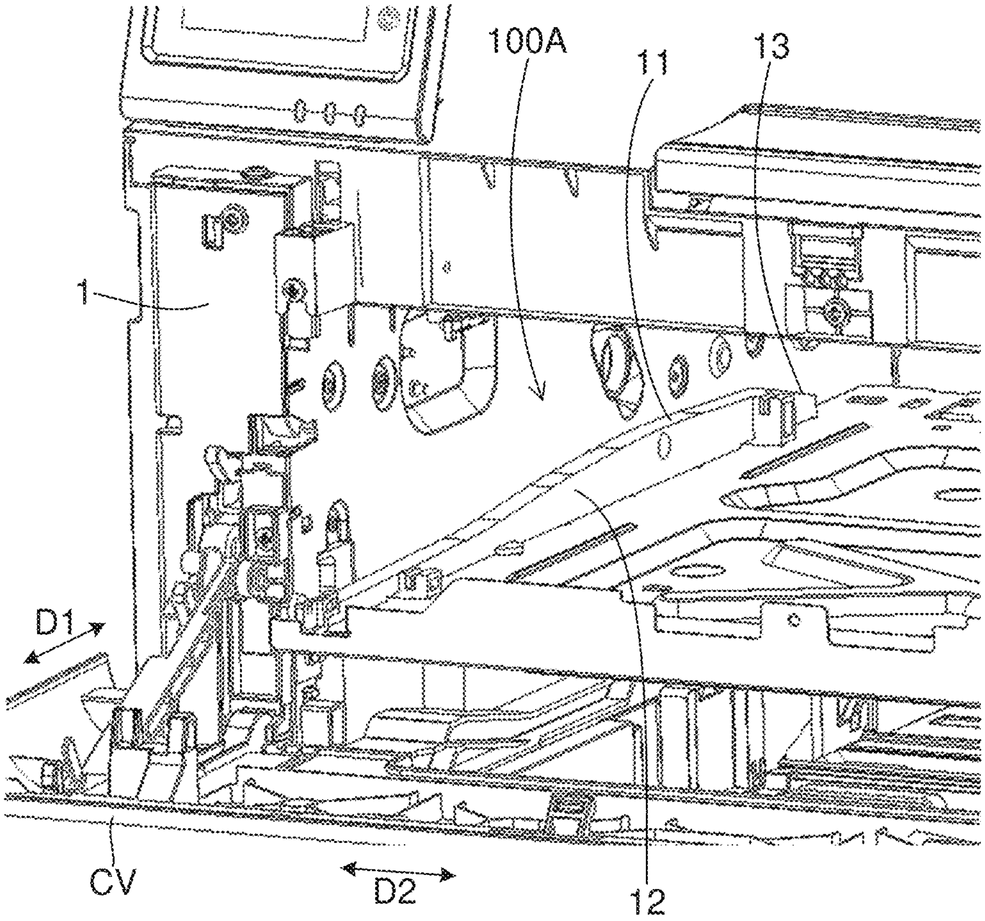
FIG. 11 is a perspective view showing a guide member in the image forming apparatus according to the embodiment.
Figure 12:
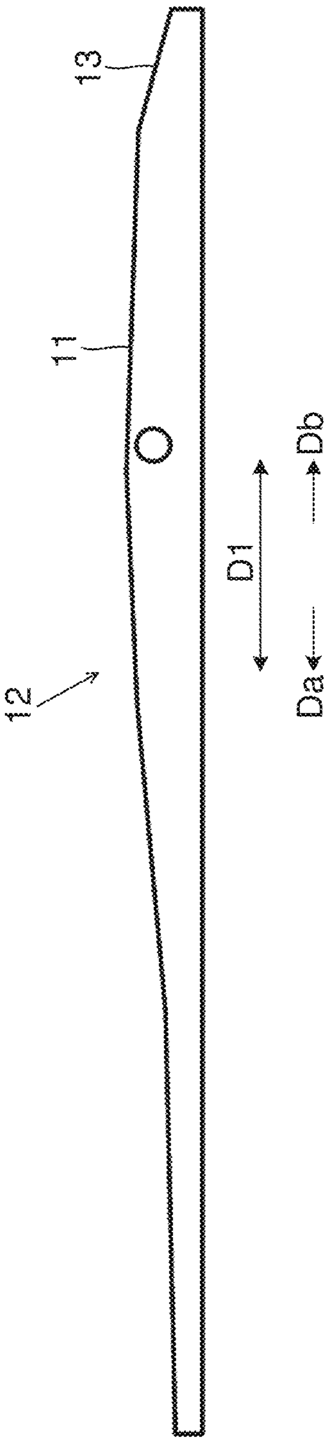
FIG. 12 is a side view when the guide member shown in FIG. 11 is viewed in a second direction.

As shown in FIGS. 11 and 12, the main body frame 1 includes a guide surface 11 which extends in the first direction D1. The guide surface 11 is formed in a guide member 12. The upper surface of the guide member 12 serves as the guide surface 11. Although a detailed description will be given later, the upper surface (that is, the guide surface 11) of the guide member 12 is not flat.

The guide member 12 is arranged on each of one side and the other side of the fitting region 100A in the second direction D2. Specifically, the guide member 12 is arranged in each of the lower right and the lower left of the fitting region 100A. The shapes of the guide surfaces 11 of the guide members 12 are the same as each other. In FIG. 11, the guide member 12 arranged in the lower right of the fitting region 100A is not shown.

Figure 13:
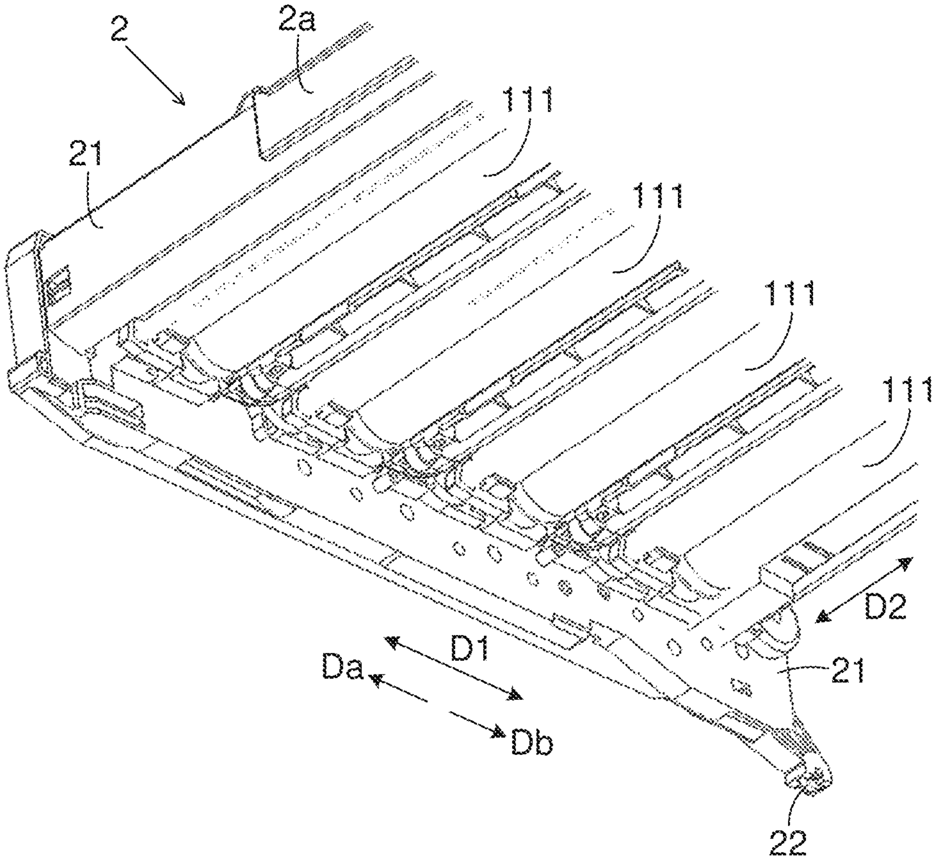
FIG. 13 is a perspective view showing a lower left portion of the process unit in the image forming apparatus according to the embodiment when the lower left portion is viewed from below.

As shown in FIG. 13, the process unit 2 includes a roller 22 which is rotatable around an axis extending in the second direction D2. The roller 22 is rotatably supported to the unit frame 21. The roller 22 is arranged in each of the right side plate and the left side plate of the unit frame 21. The roller 22 is arranged at an end portion of the unit frame 21 on the other side (that is, the back side) in the first direction D1. In other words, the roller 22 is arranged at an end portion on the upstream side in the pulling-out direction of the process unit 2 when the process unit 2 is removed from the main body frame 1. In FIG. 13, the roller 22 arranged in the right side plate of the unit frame 21 is not shown.

The roller 22 travels on the guide surface 11 when the process unit 2 is fitted into or removed from the fitting region 100A. When the process unit 2 is fitted into or removed from the fitting region 100A, the grip portion 2*a* of the unit frame 21 is slightly raised, and thus only the roller 22 is brought into contact with the guide surface 11. In this state, the process unit 2 is pressed in or pulled out, and thus the roller 22 is rotated, with the result that the process unit 2 is moved in the first direction D1. In this way, the process unit 2 is easily fitted and removed.

Figure 14:
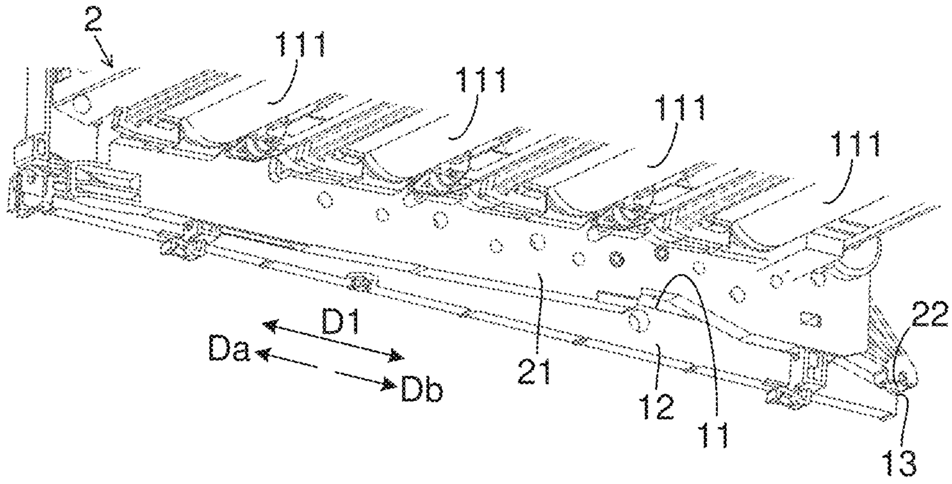
FIG. 14 is a perspective view showing a positional relationship between the guide member and the process unit in the image forming apparatus according to the embodiment.

A positional relationship between the guide surface 11 and the roller 22 in the state where the process unit 2 is fitted into the fitting region 100A is shown in FIG. 14. Although not shown in the figure, in the state of FIG. 14, a unit side locating member which is provided in the process unit 2 engages with a main body side locating member which is provided in the main body frame 1, and thus the process unit 2 is located with respect to the main body frame 1. For example, the unit side locating member is a projection which protrudes in the second direction D2. The main body side locating member is a long hole which penetrates in the second direction D2 and in which the first direction D1 is a longitudinal direction. The projection engages with the long hole (that is, the projection is inserted into the long hole), and thus the movement (displacement) of the process unit 2 in the up/down direction is restricted.

The process unit 2 is pressed into the fitting region 100A to some extent, and thus the unit side locating member engages with the main body side locating member. In this way, the roller 22 is not brought into contact with the guide surface 11. In a state where the unit side locating member engages with the main body side locating member, even when the process unit 2 is pressed in or pulled out, the process unit 2 is moved in the first direction D1 without displacing the position in the up/down direction. In other words, in the state where the unit side locating member engages with the main body side locating member, the main body frame 1 supports the process unit 2 without displacing the position of the unit side contacts 20 in the up/down direction. The process unit 2 is pressed in to the end as it is, and thus the process unit 2 is fitted into the fitting region 100A. In this way, the state shown in FIG. 14 is achieved.

On the other hand, when the process unit 2 is pulled out from the fitting region 100A, the process unit 2 is moved in the first direction D1 until the engagement of the main body side locating member and the unit side locating member is released without the position of the unit side contacts 20 in the up/down direction being displaced. In other words, the main body frame 1 supports the process unit 2 without displacing the position of the unit side contacts 20 in the up/down direction.

Here, the main body side contact 10 is the torsion coil spring in which the up/down direction is the axial direction, and the arm portion 10*a* on one side is brought into contact with the unit side contact 20. When the main body side contact 10 as described above is used, if the position of the unit side contacts 20 in the up/down direction is displaced in a state where the main body side contacts 10 are in contact with the unit side contacts 20, the arm portions 10*a* of the main body side contacts 10 are pulled in the up/down direction, with the result that an extra load is applied to the main body side contacts 10. Hence, in the state where the main body side contacts 10 are in contact with the unit side contacts 20, the position of the unit side contacts 20 in the up/down direction is preferably prevented from being displaced.

<Avoidance of Collision of Main Body Side Contact with Unit Side Contact>

As shown in FIGS. 11 and 12, the guide surface 11 includes an inclination surface 13 in a predetermined position. The inclination surface 13 is provided in the guide surface 11 in order to avoid collision of the main body side contacts 10 with the unit side contacts 20 when the process unit 2 is pulled out from the fitting region 100A.

In order to avoid collision of the main body side contacts 10 with the unit side contacts 20, it is necessary to displace the position of the unit side contacts 20 in the up/down direction to a position where the unit side contacts 20 do not collide with the main body side contacts 10. In other words, it is necessary to displace the position of the process unit 2 in the up/down direction.

However, the intermediate transfer unit 120 is arranged below the process unit 2. In other words, the intermediate transfer belt 121 is arranged below the process unit 2. The intermediate transfer belt 121 makes contact with the photosensitive drums 111 serving as constituent elements of the process unit 2 in the up/down direction. Hence, the position of the process unit 2 in the up/down direction cannot be further displaced downward.

Hence, the inclination surface 13 is a surface which is inclined upward (hereinafter simply referred to as inclined upward) from the upstream side toward the downstream side in the pulling-out direction of the process unit 2 when the process unit 2 is removed from the main body frame 1. In other words, when the intermediate transfer belt 121 is arranged on one side of the process unit 2 in the up/down direction, the inclination surface 13 is inclined to the other side opposite to the one side in the up/down direction from the upstream side toward the downstream side in the pulling-out direction of the process unit 2 when the process unit 2 is removed from the main body frame 1. Furthermore, in other words, the inclination surface 13 is inclined in a direction away from the intermediate transfer belt 121 from the upstream side toward the downstream side in the pulling-out direction of the process unit 2 when the process unit 2 is removed from the main body frame 1.

In this way, when the process unit 2 is pulled out from the fitting region 100A, the roller 22 travels on the inclination surface 13, and thus the position of the unit side contacts 20 in the up/down direction is displaced. Since the inclination surface 13 is inclined upward, the position of the unit side contacts 20 in the up/down direction is displaced upward. As the angle of inclination of the inclination surface 13 relative to the first direction D1 (that is, the horizontal direction) is increased, the position of the unit side contacts 20 in the up/down direction is further displaced upward.

A specific description will be given below with reference to FIGS. 15 and 16. The upper, middle and lower diagrams of FIG. 15 correspond to the upper, middle and lower diagrams of FIG. 16, respectively. In FIG. 16, for convenience, the details of the unit side contacts 20 are not shown, and instead, regions where the unit side contacts 20 are present are indicated by dotted lines. In FIG. 16, only two main body side contacts 10 adjacent in the first direction D1 are shown.

Figure 15:
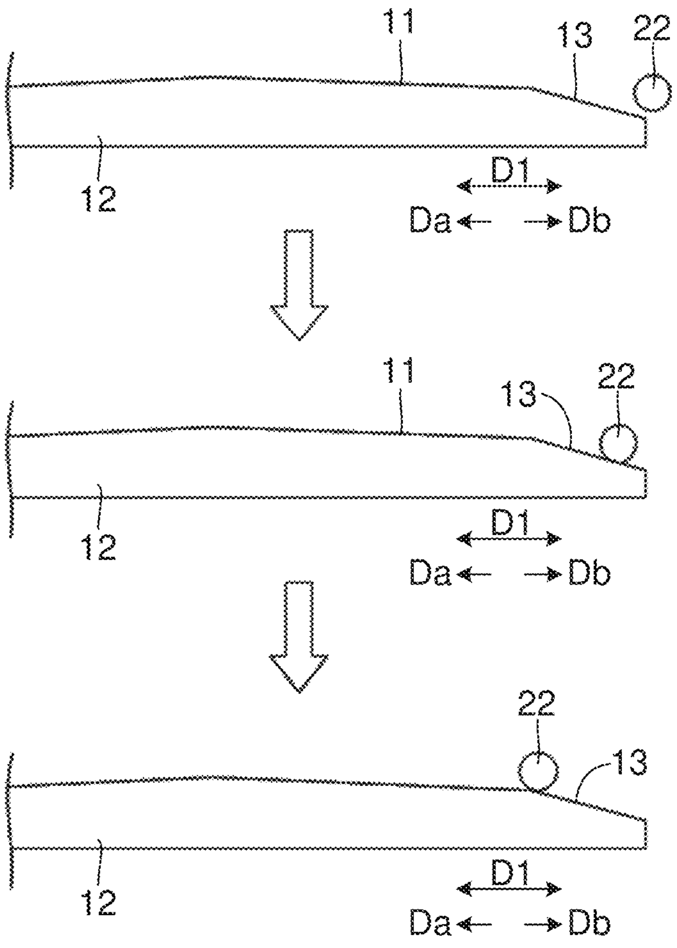
FIG. 15 is a schematic view showing a state where a roller travels on a guide surface in the image forming apparatus according to the embodiment.
Figure 16:
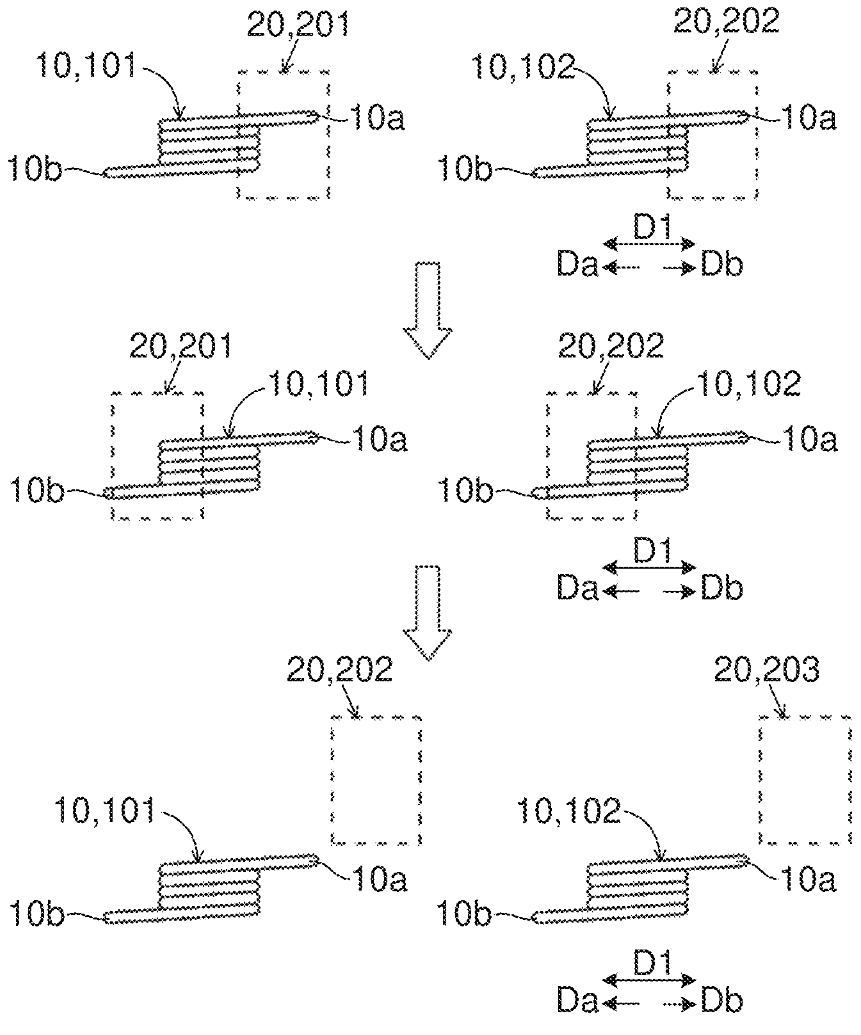
FIG. 16 is a schematic view showing a positional relationship between the main body side contacts and the unit side contacts in the image forming apparatus according to the embodiment.

When the process unit 2 is fitted into the fitting region 100A, a state shown in the upper diagrams of FIGS. 15 and 16 is achieved. In this state, the main body side locating member engages with the unit side locating member, and thus the roller 22 is not in contact with the guide surface 11 (inclination surface 13). The main body side contacts 10 are in contact with the unit side contacts 20.

In the initial stage of pulling out the process unit 2 in the state (state shown in the upper diagrams of FIGS. 15 and 16) where the process unit 2 is fitted into the fitting region 100A, the main body side locating member engages with the unit side locating member, and thus the roller 22 is not in contact with the guide surface 11 (inclination surface 13). Hence, in the initial stage of pulling out the process unit 2, the position of the unit side contacts 20 in the up/down direction is not displaced. The process unit 2 is moved to the one side in the first direction D1 (that is, the pulling-out direction Da) in a state where the unit side contacts 20 are in contact with the main body side contacts 10 without displacing the position of the unit side contacts 20 in the up/down direction.

Thereafter, the engagement of the main body side locating member with the unit side locating member is released. Then, as shown in the middle diagram of FIG. 15, the roller 22 makes contact with the inclination surface 13. Here, as shown in the middle diagram of FIG. 16, the contact of the main body side contacts 10 (the arm portions 10*a* thereof) and the unit side contacts 20 is released. In other words, the main body frame 1 supports the process unit 2 until the contact of the main body side contacts 10 and the unit side contacts 20 is released without displacing the position of the unit side contacts 20 in the up/down direction. In the middle diagram of FIG. 16, a part of the main body side contacts 10 overlap the unit side contacts 20. However, the state shown in the middle diagram of FIG. 16 corresponds to the state shown in the upper diagram of FIG. 10, and thus the main body side contacts 10 are not in contact with the unit side contacts 20.

When the roller 22 reaches and makes contact with the inclination surface 13, the roller 22 travels on the inclination surface 13. In this way, the position of the unit side contacts 20 in the up/down direction is gradually displaced upward. In other words, after the contact of the main body side contacts 10 and the unit side contacts 20 is released, the position of the unit side contacts 20 in the up/down direction is gradually displaced upward. In this way, the position of the unit side contacts 20 in the up/down direction is displaced to an avoidance position where the unit side contacts 20 do not collide with the main body side contacts 10 located on the downstream side in the pulling-out direction Da. The position of the unit side contacts 20 in the up/down direction shown in the lower diagram of FIG. 16 is the avoidance position.

Here, the inclination surface 13 is provided in a part of the guide surface 11 which makes contact with the roller 22 after the contact of the main body side contacts 10 and the unit side contacts 20 is released when the process unit 2 is pulled out from the fitting region 100A. In this way, when the process unit 2 is pulled out from the fitting region 100A, the unit side contacts 20 do not displace the position in the up/down direction until the contact of the unit side contacts 20 and the main body side contacts 10 to which the unit side contacts 20 are assigned is released. When the process unit 2 is pulled out from the fitting region 100A, after the contact of the unit side contacts 20 and the main body side contacts 10 to which the unit side contacts 20 are assigned is released, the unit side contacts 20 displace the position in the up/down direction to the avoidance position before the unit side contacts 20 reach the main body side contacts 10 which are located immediately on the downstream side in the pulling-out direction of the process unit 2 with respect to the main body side contacts 10 to which the unit side contacts 20 are assigned (that is, the main body side contacts 10 adjacent on the downstream side in the pulling-out direction to the main body side contacts 10 to which the unit side contacts 20 are assigned.

A specific description will be given below with reference to FIG. 16. Here, the unit side contact 20 on which attention is focused is identified with a symbol 202, and the main body side contact 10 to which the unit side contact 202 is assigned is identified with a symbol 102. The main body side contact 10 which is located on the downstream side in the pulling-out direction of the process unit 2 with respect to the main body side contact 102 is identified with a symbol 101, and the unit side contact 20 which is assigned to the main body side contact 101 is identified with a symbol 201. Furthermore, the unit side contact 20 which is located on the upstream side in the pulling-out direction of the process unit 2 with respect to the unit side contact 202 is identified with a symbol 203.

As shown in FIG. 16, after the contact of the unit side contact 202 and the main body side contact 102 to which the unit side contact 202 is assigned is released, the unit side contact 202 gradually displaces its position in the up/down direction upward (the state shown in the middle diagram of FIG. 16 transitions to the state shown in the lower diagram of FIG. 6). The unit side contact 202 gradually displaces its position in the up/down direction upward to reach the avoidance position.

Here, the unit side contact 202 does not reach the main body side contact 101. In other words, between the main body side contact 102 to which the unit side contact 202 is assigned and the main body side contact 101 located on the downstream side in the pulling-out direction with respect to the main body side contact 102 in the first direction D1, the unit side contact 202 displaces the position in the up/down direction to the avoidance position. In this way, the unit side contact 202 does not collide with the main body side contact 101.

Thereafter, the position of the unit side contacts 20 in the up/down direction is maintained in the avoidance position until the unit side contact 20 on the most upstream side in the pulling-out direction of the process unit 2 passes through the main body side contact 10 on the most downstream side in the pulling-out direction. After the position of the unit side contacts 20 in the up/down direction reaches the avoidance position, the guide surface 11 is inclined downward toward the pulling-out direction of the process unit 2. When the roller 22 travels on the surface of the guide surface 11 which is inclined downward, the position of the unit side contacts 20 in the up/down direction is displaced downward. However, the position of the unit side contacts 20 in the up/down direction is not displaced to a position where the main body side contacts 10 collide with the unit side contacts 20.

In the present embodiment, the inclination surface 13 is provided in the guide surface 11, and thus when the process unit 2 is pulled out from the fitting region 100A, the position of the unit side contacts 20 in the up/down direction is displaced to the avoidance position where the unit side contacts 20 do not collide with the main body side contacts 10 in the first direction D1, and the position of the unit side contacts 20 in the up/down direction can be maintained in the avoidance position. In this way, when the operator performs the operation of removing the process unit 2 from the main body of the image forming apparatus 100, it is possible to easily suppress collision of the unit side contacts 20 with the main body side contacts 10 in the first direction D1. In other words, it is possible to suppress a failure caused by collision of the unit side contacts 20 with the main body side contacts 10. Furthermore, in other words, the process unit 2 can be safely removed.

In this configuration, the operator who removes the process unit 2 from the main body of the apparatus only pulls out the process unit 2 such that the roller 22 travels on the guide surface 11 without paying attention to a positional relationship between the main body side contacts 10 and the unit side contacts 20, with the result that this configuration is convenient for the operator. In other words, it is easy to remove the process unit 2. Furthermore, in other words, operability for removing the process unit 2 is enhanced.

Furthermore, it is not necessary to separately provide a dedicated member for the removal of the process unit 2. In other words, it is sufficient to provide only the inclination surface in the guide surface 11. In this way, the structure is not complicated, and thus it is possible to suppress an increase in cost.

In the present embodiment, the intermediate transfer belt 121 is arranged on a lower side which is one side of the process unit 2 in the up/down direction. Hence, the inclination surface 13 is inclined upward from the upstream side toward the downstream side in the pulling-out direction of the process unit 2. In other words, the inclination surface 13 is inclined to the other side opposite to the one side in the up/down direction from the upstream side toward the downstream side in the pulling-out direction of the process unit 2. In this way, even when the position of the process unit 2 in the up/down direction is displaced (in other words, even when the position of the unit side contacts 20 in the up/down direction is displaced to the avoidance position), the process unit 2 does not interfere with the intermediate transfer belt 121.

For example, although not shown in the figure, depending on the type of image forming apparatus 100, the intermediate transfer belt 121 is arranged on an upper side which is the other side of the process unit 2 in the up/down direction. In this case, the inclination surface 13 is inclined downward from the upstream side toward the downstream side in the pulling-out direction of the process unit 2. In other words, the inclination surface 13 is inclined to the one side in the up/down direction from the upstream side toward the downstream side in the pulling-out direction of the process unit 2. In this way, the position of the process unit 2 in the up/down direction can be displaced without the process unit 2 interfering with the intermediate transfer belt 121.

In the present embodiment, the inclination surface 13 is provided in the part of the guide surface 11 which makes contact with the roller 22 after the contact of the main body side contacts 10 and the unit side contacts 20 is released when the process unit 2 is pulled out from the fitting region 100A. Furthermore, when the process unit 2 is pulled out from the fitting region 100A, the main body frame 1 supports the process unit 2 until the contact of the main body side contacts 10 and the unit side contacts 20 is released without displacing the position of the unit side contacts 20 in the up/down direction. In other words, when the process unit 2 is pulled out from the fitting region 100A, the position of the unit side contacts 20 in the up/down direction is not displaced until the contact of the main body side contacts 10 and the unit side contacts 20 is released, and the roller 22 travels on the inclination surface 13 after the contact of the main body side contacts 10 and the unit side contacts 20 is released.

In this way, in a state where the main body side contacts 10 are in contact with the unit side contacts 20, it is possible to suppress the displacement of the position of the unit side contacts 20 in the up/down direction. Consequently, when the process unit 2 is pulled out from the fitting region 100A, an extra load is not applied to the main body side contacts 10.

It should be considered that the embodiment disclosed herein is illustrative in all respects and not restrictive. The scope of the present disclosure is indicated not by the description of the above embodiment but by the scope of claims, and furthermore, meanings equivalent to the scope of claims and all changes within the scope are included therein.

What is claimed is:

1. An image forming apparatus comprising:
a main body frame that includes a fitting region;
a process unit that
 is removably fitted into the fitting region,
 can be removed from the main body frame by being pulled out to one side in a first direction orthogonal to an up/down direction in a state where the process unit is fitted into the fitting region and
 performs development process which develops an electrostatic latent image into a toner image;
a plurality of main body side contacts that
 are arranged in the main body frame,
 protrude toward the fitting region in a second direction horizontally orthogonal to the first direction and
 are spaced in the first direction; and
a plurality of unit side contacts that
 are arranged in the process unit,
 are respectively assigned to the main body side contacts and
 are brought into contact with the main body side contacts to which the unit side contacts are assigned in the state where the process unit is fitted into the fitting region,
wherein the main body frame includes a guide surface that extends in the first direction,
the process unit includes a roller that travels on the guide surface when the process unit is fitted into or removed from the fitting region,
the guide surface includes an inclination surface that is inclined either upward or downward in the up/down direction toward a downstream side from an upstream side in a pulling-out direction when the process unit is pulled out from the fitting region and
when the process unit is pulled out from the fitting region, the roller travels on the inclination surface such that a position of the unit side contacts in the up/down direction is displaced to an avoidance position where the unit side contacts do not collide with the main body side contacts located on the downstream side in the pulling-out direction.

2. The image forming apparatus according to claim 1, wherein the inclination surface is provided in a part of the guide surface that makes contact with the roller after the contact of the main body side contacts and the unit side contacts is released when the process unit is pulled out from the fitting region.

3. The image forming apparatus according to claim 1, wherein when the process unit is pulled out from the fitting region, the main body frame supports the process unit until the contact of the main body side contacts and the unit side contacts is released without displacing the position of the unit side contacts in the up/down direction.

4. The image forming apparatus according to claim 1, wherein when the process unit is pulled out from the fitting region, the unit side contacts displace the position of the unit side contacts in the up/down direction to the avoidance position before the unit side contacts reach the main body side contacts that are located immediately on the downstream side in the pulling-out direction with respect to the main body side contacts to which the unit side contacts are assigned.

5. The image forming apparatus according to claim 1, further comprising:

an intermediate transfer member to which the toner image is transferred from the process unit, wherein the intermediate transfer member is arranged on one side of the process unit in the up/down direction, and the inclination surface is inclined to another side opposite to the one side in the up/down direction toward the downstream side from the upstream side in the pulling-out direction.

6. The image forming apparatus according to claim 1, wherein each of the main body side contacts is a torsion coil spring which includes a wound spring portion and a pair of arm portions extending tangentially from both ends of the wound spring portion and in which the up/down direction is an axial direction of the wound spring portion, one of the arm portions of the torsion coil spring protrudes to the fitting region such that the main body side contacts can be brought into contact with the unit side contacts and in the state where the process unit is fitted into the fitting region, the one of the arm portions is pressed in a torsional direction of the torsion coil spring.

* * * * *